United States Patent [19]

Topper et al.

[11] Patent Number: 5,541,987
[45] Date of Patent: Jul. 30, 1996

[54] CONNECTION-ORIENTED CONGESTION CONTROLLER FOR COMMON CHANNEL SIGNALING NETWORK

[75] Inventors: Jeffrey Topper; Satoko Nomura, both of Tokyo, Japan

[73] Assignee: NEC Corporation, Tokyo, Japan

[21] Appl. No.: 485,034

[22] Filed: Jun. 7, 1995

Related U.S. Application Data

[63] Continuation of Ser. No. 179,716, Jan. 11, 1994, abandoned.

[30] Foreign Application Priority Data

Jan. 11, 1993 [JP] Japan ................................. 5-002864

[51] Int. Cl.[6] ............................................... H04M 7/00
[52] U.S. Cl. ...................... 379/230; 379/269; 370/58.3; 370/68.1; 370/58.2; 340/827
[58] Field of Search .................................. 379/230, 220, 379/221, 93, 94, 334, 243, 197, 137, 269; 370/54, 601[,] 58.3, 68.1, 58.2; 395/200; 340/827; 364/437

[56] References Cited

U.S. PATENT DOCUMENTS

| | | | |
|---|---|---|---|
| 4,907,256 | 3/1990 | Higuchi et al. | 379/137 |
| 4,931,941 | 6/1990 | Krishnan | 364/437 |
| 4,979,118 | 12/1990 | Kheradpir | 370/54 |
| 4,984,264 | 1/1991 | Katsube | 379/197 |
| 5,029,164 | 7/1991 | Goldstein et al. | 370/95.1 |
| 5,042,027 | 8/1991 | Takase et al. | 379/221 |
| 5,042,064 | 8/1991 | Chung et al. | 379/243 |
| 5,067,074 | 11/1991 | Farel et al. | 395/200 |
| 5,128,932 | 7/1992 | Li | 370/60 |
| 5,268,895 | 12/1993 | Topper | 379/230 |
| 5,327,484 | 7/1994 | Connell et al. | 379/93 |

FOREIGN PATENT DOCUMENTS

| | | | |
|---|---|---|---|
| 0487235 | 5/1992 | European Pat. Off. | H04L 12/56 |
| 0498407 | 8/1992 | European Pat. Off. | H04Q 11/04 |

*Primary Examiner*—Jeffery Hofsass
*Assistant Examiner*—Scott Wolinsky
*Attorney, Agent, or Firm*—Sughrue, Mion, Zinn, Macpeak & Seas

[57] ABSTRACT

A connection-oriented congestion controller for a common channel signaling network comprises a memory for storing data representative of established connections, and a data transceiver connected between user terminals and remote signaling nodes for receiving and sending data messages on the established connections. The data transceiver is responsive to a blocking status indication for imposing flow control on the data messages and marking the established connections as blocked in the memory, and is responsive to an unblocking status indication for removing the flow control and marking the established connections as unblocked in the memory. A resource monitor compares a resource availability value with a number of thresholds, and produces the blocking status indication when it becomes lower than a start-of-blocking threshold until it becomes higher than an end-of-blocking threshold, and initiates the unblocking status indication when the resource availability value becomes greater than a start-of-unblocking threshold when at least one established connection is being blocked and continues the unblocking status indication until the availability value becomes less than an end-of-unblocking threshold or until there is no established connection which is blocked. When the established connections are marked in the memory, the resource monitor compares the resource availability value with a new connection threshold to determine whether a new connection request is to be allowed or refused.

5 Claims, 7 Drawing Sheets

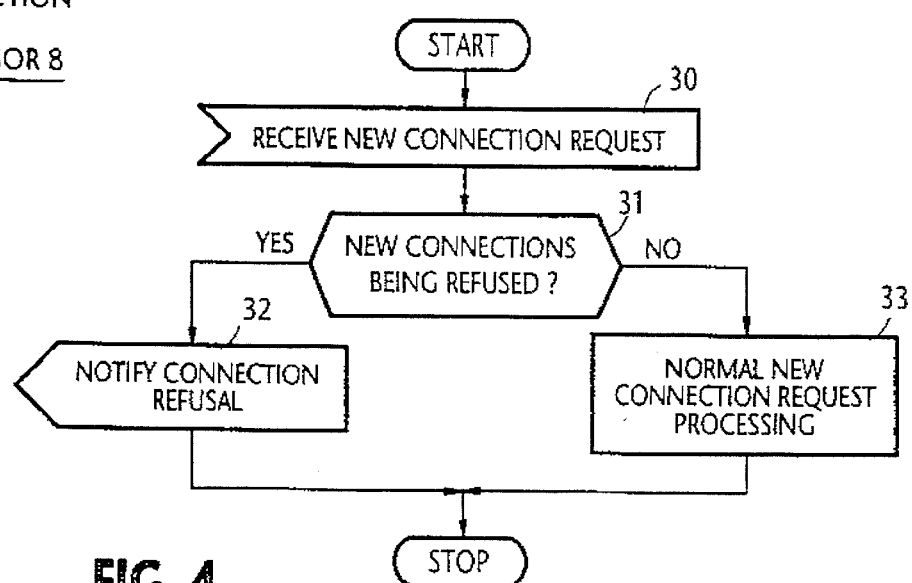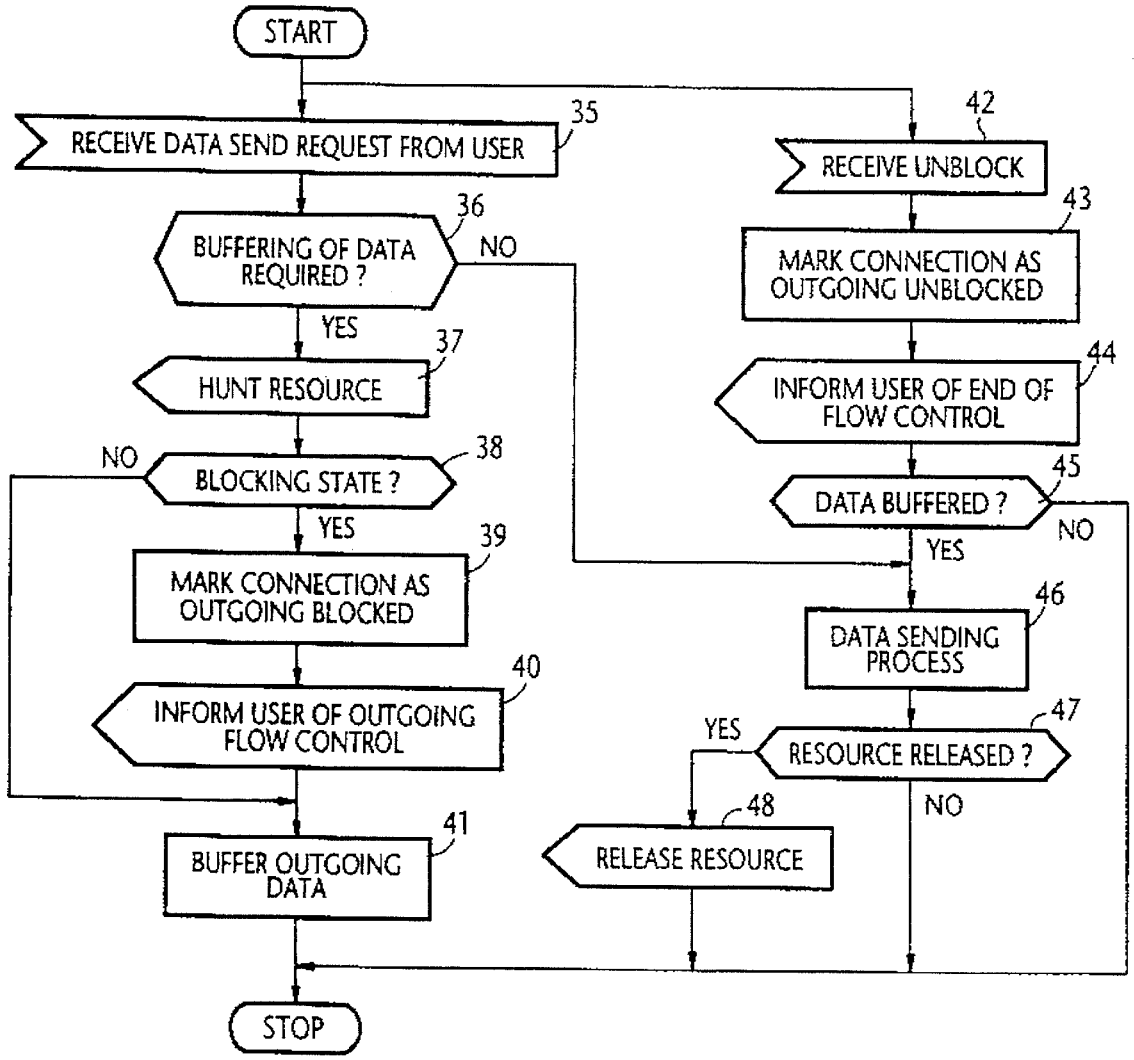

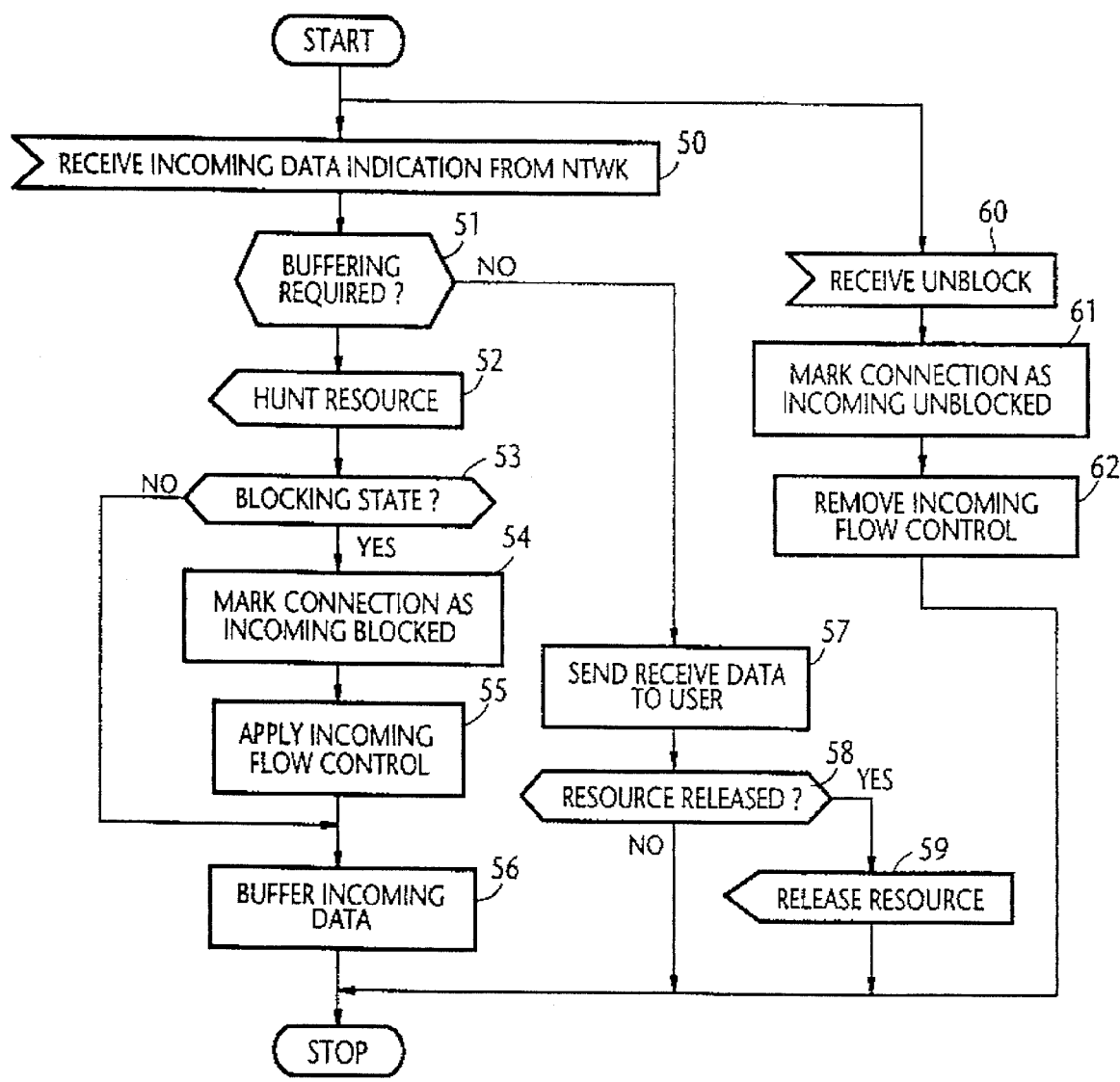

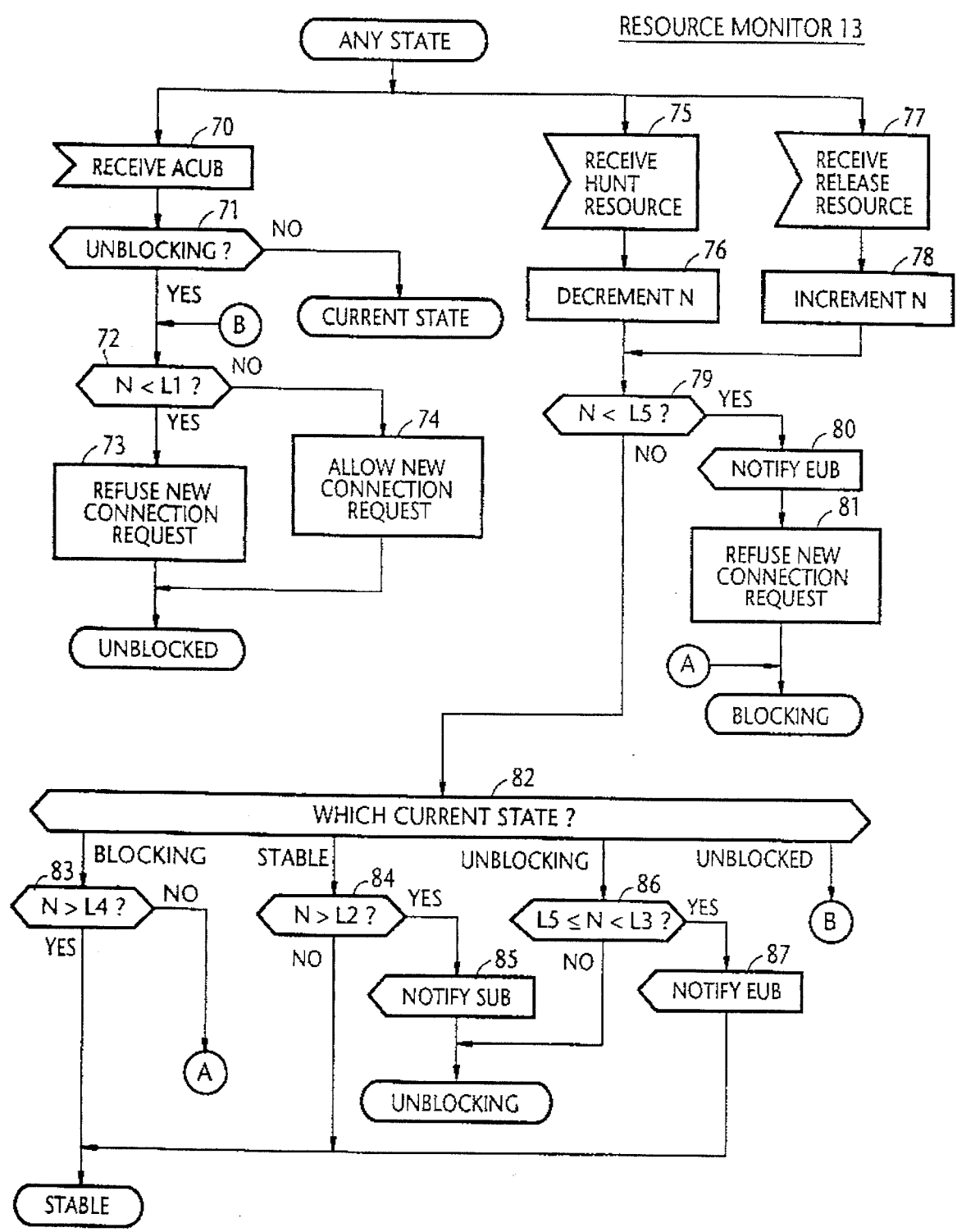

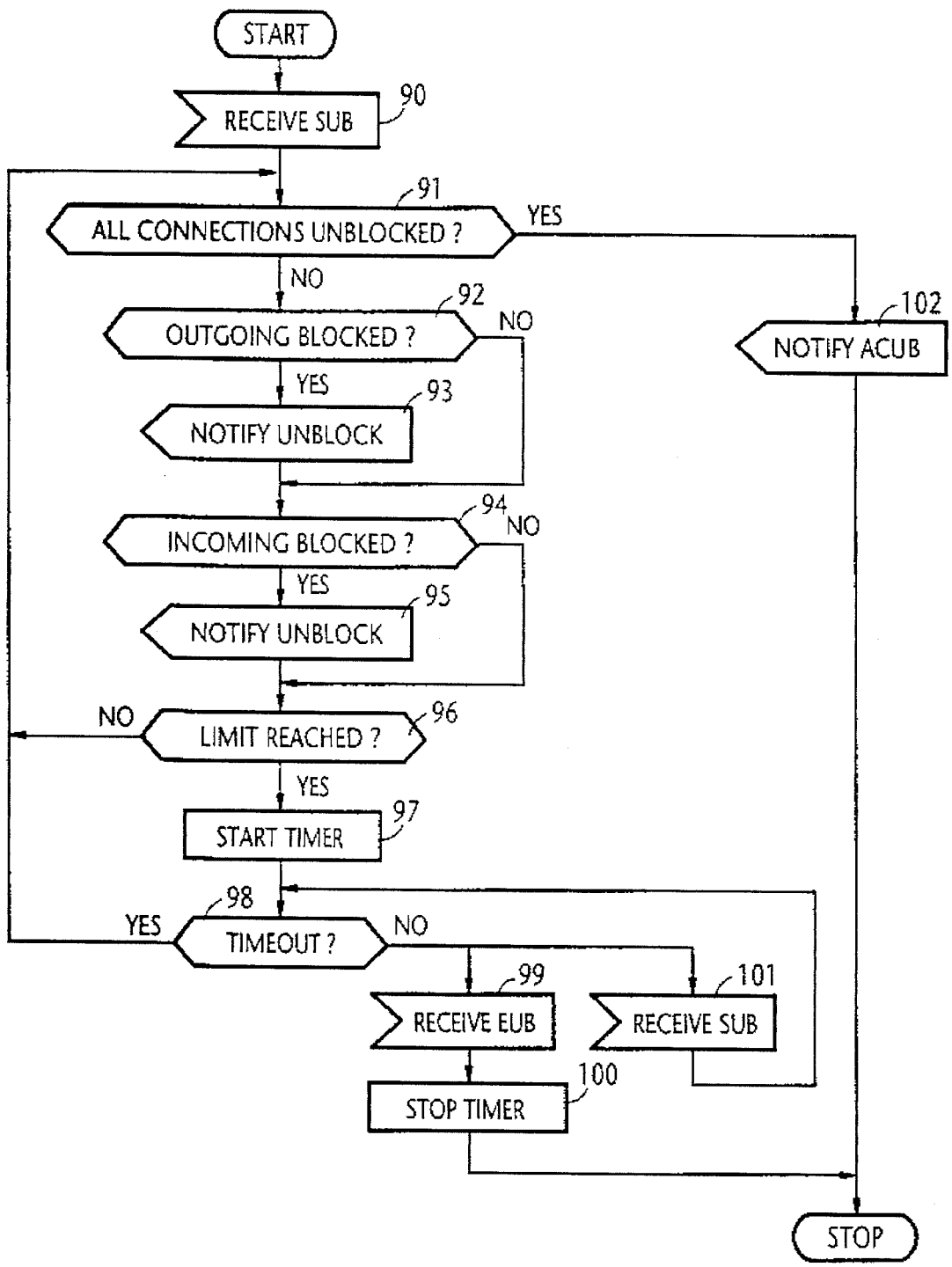

CONNECTION-ORIENTED CONGESTION CONTROLLER FOR COMMON CHANNEL SIGNALING NETWORK

This is a Continuation of application Ser. No. 08/179,716 filed Jan. 11, 1994, now abandoned.

BACKGROUND OF THE INVENTION

1. Field of the Invention

The present invention relates generally to common channel signaling networks, and more specifically to a connection-oriented congestion controller for the signaling connection control part (SCCP) of the CCITT signaling system number 7 for ISDN (integrated services digital network).

2. Description of the Related Art

According to CCITT Recommendations Q.711–Q.714 for Signaling System Number 7, the signaling connection control part (SCCP) is situated between the user layer and the message transfer part (MTP) to support both connectionless and connection-oriented network services between signaling nodes. The signaling connection control part temporarily hold data messages when flow control is being effected and monitors available resources. If the amount of available resources becomes smaller than a prescribed value, a limit is imposed on new connection requests so that the number of established connections is held constant.

However, there is no mechanism for providing flow control on the established connections. Because of the lacking of the flow control mechanism, the prior art signaling connection control part is unable to match demand and available resources and as a result it cannot cope with a rapid increase in traffic without data loss and clear-down of established connections.

SUMMARY OF THE INVENTION

It is therefore an object of the present invention to provide a connection-oriented congestion controller for a common channel signaling network capable of providing flow control on established connections in order to handle a rapid increase in traffic without causing data loss and clearing down established connections.

In a connection-oriented congestion controller of the present invention which is adapted for use in one of a plurality of interconnected signaling nodes of a common channel signaling network, a connection setup processor establishes a connection in response to a connection request when there is a grant indication that a connection request is allowed, and a memory is provided for storing data representative of the established connections marked as blocked or unblocked. A data receiver and a data sender are connected between user terminals and one of the signaling nodes for receiving and sending data messages on the established connections. According to the present invention, a resource availability value is generated representing the availability of the established connections. The resource availability value is compared with a start-of-blocking threshold, an end-of-blocking threshold, a start-of-unblocking threshold and an end-of-unblocking threshold, and a blocking status indication is produced when the resource availability value becomes lower than the start-of-blocking threshold until the resource availability value becomes higher than the end-of-blocking threshold, or an unblocking status indication is produced when the resource availability value becomes higher than the start-of-unblocking threshold until the resource availability value becomes lower than the end-of-unblocking threshold. Flow control is imposed on the data messages and the established connections are marked as blocked in the memory in response to the blocking status indication, and the flow control is removed and the established connections are marked as unblocked in the memory in response to the unblocking status indication. The resource availability value is further compared with a new connection threshold if all of the established connections are marked unblocked in the memory to produce a grant indication for a new connection request if the resource availability value is determined to be lower than the new connection threshold.

BRIEF DESCRIPTION OF THE DRAWINGS

The present invention will be described in further detail with reference to the accompanying drawings, in which:

FIG. 3 is a flowchart of the operation of a connection setup processor;

FIG. 4 is a flowchart of the operation of a data sender;

FIG. 5 is a flowchart of the operation of a data receiver;

FIG. 6 is a flowchart of the operation of a resource monitor;

FIG. 7 is a flowchart of the operation of a congestion relief manager; and

DETAILED DESCRIPTION

Figure 1:
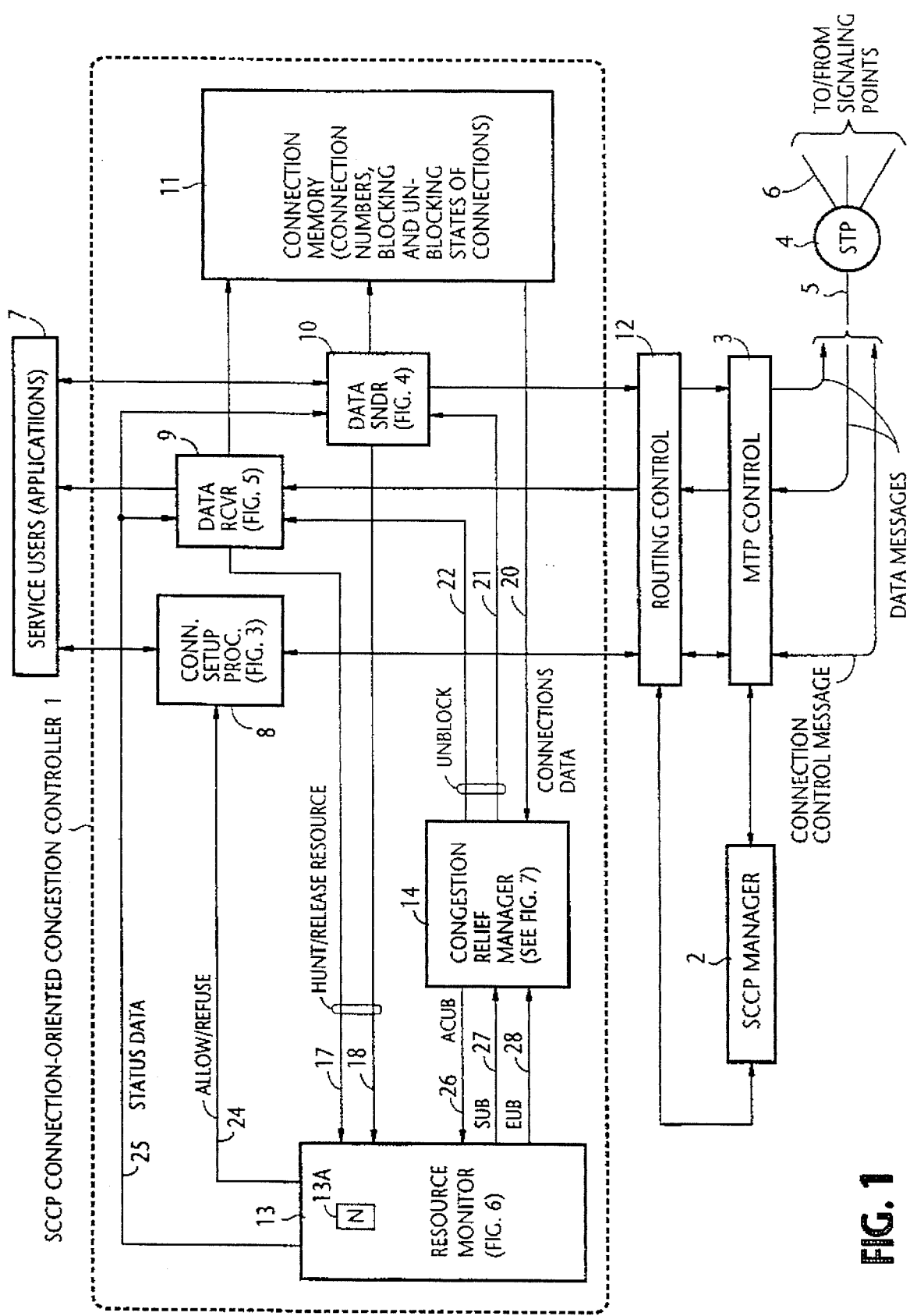
FIG. 1 is a block diagram of a signaling connection control part (SCCP) connection-oriented congestion controller of the present invention with related circuitry in a common channel signaling network, or CCITT signaling system number 7.

Referring now to FIG. 1, there is shown a signaling point of a common channel signaling system number 7 (SS7) according to the present invention. The signaling point generally comprises a signaling connection control part (SCCP) connection-oriented congestion controller 1, a SCCP manager 2 and a message transfer part (MTP) controller 3. The MTP controller 3 is connected via signaling links 5 to a remote signal transfer point (STP) 4 via which the links are connected further to one or more signal end points (not shown) through signaling links 6.

According to the present invention, the SCCP connection-oriented congestion controller 1 comprises a connection setup processor 8, a data receiver 9 and a data sender 10, all of which are connected to service users 7, or applications. As will be described in detail later, connection setup processor 8 establishes a connection in response to a connection request from user 7 or STP 4 if the request is granted and exchanges connection control messages with the users and the remote STP to establish a connection. With a connection being established, users send a data send request.

A resource monitor 13 is provided to effect overall control of the connection-oriented congestion controller 1, including the issuance of allow/refuse indication on path 24 to connection setup processor 8, comparing an available resource value with threshold values to assume one of operating states (blocking, unblocking, stable and unblocked). Resource monitor 13 includes a resource availability counter 13A which is updated in response to a "hunt resource" and a "release resource" notification from data receiver 9 and data sender 10 via paths 17 and 18.

Data sender 10 is responsive to the user's "data send" request to check to see if the buffering of data messages is required. If so, it updates the resource availability counter 13A by sending a "hunt resource" request on path 18 and checks the current operating state of a resource monitor 13 through path 25 and marks the established connection as "outgoing blocked" in a connection memory 11 if resource monitor 13 is in a blocking state. Data sender 10 then informs the user that flow control is being effected on outgoing messages received from the user, while buffering the received outgoing messages. If no buffering is required, data sender 10 immediately processes the outgoing data messages for transmission to STP 4. If, as a result of data transmission, resources are released, data sender 10 updates the resource availability counter 13A by applying a "release resource" request on path 18.

In a similar manner, data receiver 9 responds to an incoming data indication from STP 4 to check to see if buffering is required, if so, it updates the resource availability counter 13A by sending a "hunt resource" request on path 17 and checks the current state of resource monitor 13 through path 25 and marks the connection as "incoming blocked" in the connection memory 11 if the resource monitor 13 is in a blocking state, Data receiver 9 informs the STP 4 that flow control is effected on received incoming messages, while buffering the messages. If no buffering is required, data receiver 9 immediately processes the incoming data messages for transmission to the user, If, as a result of handling incoming data to the user, resources are released, data receiver 9 updates the resource availability counter 13A by applying a "release resource" request on path 17.

Data messages transmitted from user terminals may be traffic control messages and billing messages for network management and maintenance for a separate information network, or call processing signals for establishing connections in the information network. Each data message includes a network address which contains a source point code (source signaling node identifier), a destination point code (destination signaling node identifier) and a connection identifier to distinguish between established connections. A routing controller 12 provides routing of data messages between connection setup process 8, data receiver 9, data sender 10 and the MTP controller 3. Details of routing controller 12 are described in U.S. Pat. No. 5,268,895, Jeffrey Topper, "Signaling Message Routing Control Using Composite Point Code Status".

As standardized by CCITT Recommendations Q.711–Q.714 for Signaling System Number 7, the SCCP manager 2 is to provide procedures to maintain network performance by rerouting or throttling traffic in the event of failure or congestion in the network. More specifically, it maintains the congestion status of remote signaling points with which it has a signaling relationship and informs local users of changes in the states of point codes and subsystem numbers which it monitors. The MTP controller 3 serves as a transport system for users and is responsible for transporting data messages between user locations, providing physical links, data link control functions, and routing messages between user locations.

Connection memory 11 stores incoming blocking state, whether blocked or unblocked, and the outgoing blocking state, either blocked or unblocked for each established connection, and uses the connection identifier as an index to access the stored blocking states of each connection.

Connection-oriented congestion controller 1 further includes a congestion relief manager 14, the function of which is to unblock blocked connections at a predetermined rate by reading connection memory 11 via path 20 to find blocked/unblocked connections and send unblock requests to data sender 10 over path 21 for connections marked outgoing blocked and to data receiver 9 over path 22 for connections marked incoming blocked when a start unblocking (SUB) request is received on path 27 from the resource monitor 13. When the number of connections unblocked by the congestion relief manager 14 reaches a limit determined by the unblocking rate, the congestion relief manager 14 starts a timer and suspends processing until either the timer expires or else until an end unblocking (EUB) request indication is received on path 28 from the resource monitor 13. When all established connections have been unblocked, the congestion relief manager 14 sends the all-connections-unblocked (ACUB) indication to the resource monitor 13 on path 26 and then terminates processing. If, while suspended, the congestion relief manager 14 receives the end blocking (EUB) request on path 28 from the resource monitor 13, it clears the timer and terminates processing without unblocking connections and still blocked.

Figure 2:
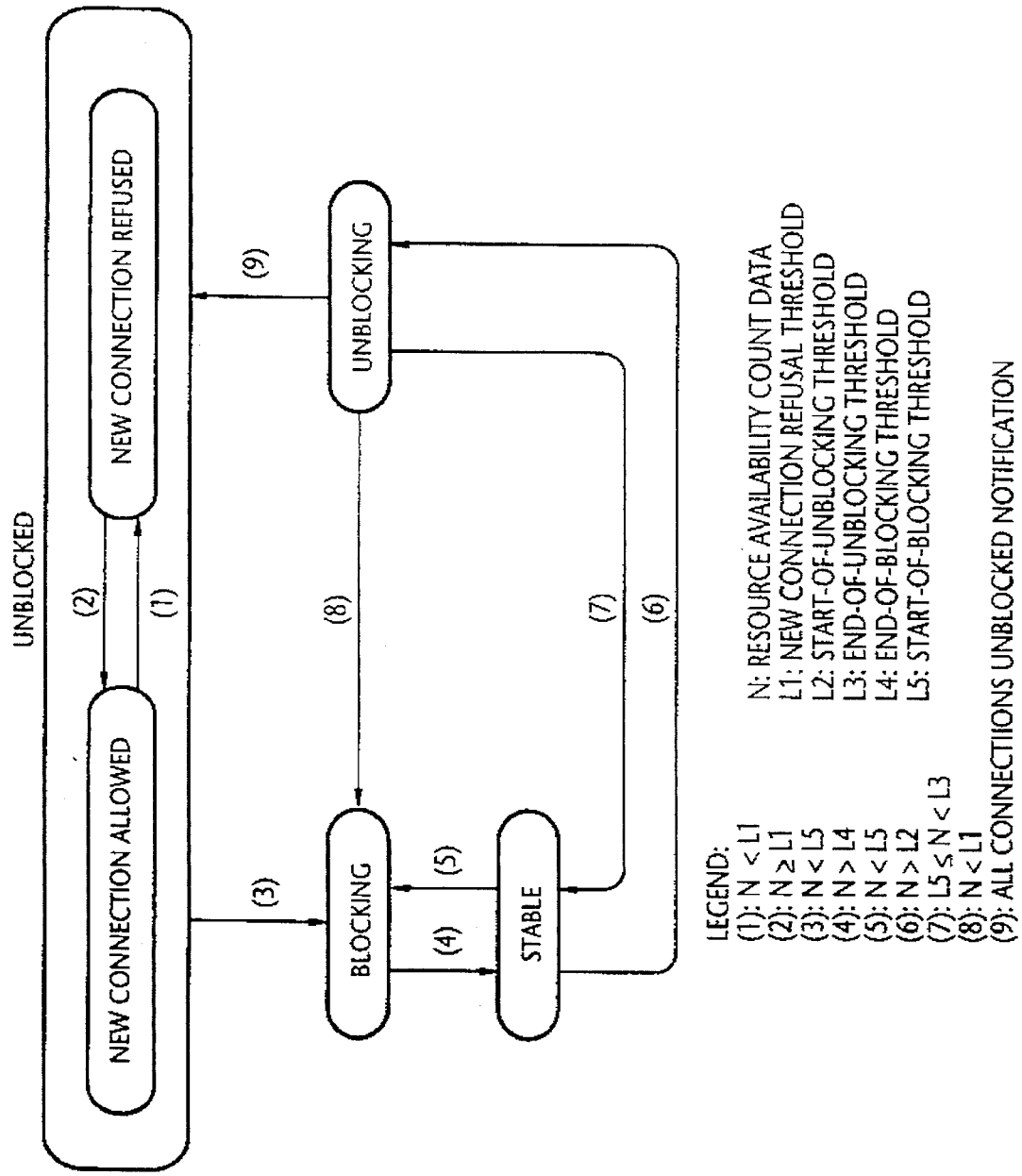
FIG. 2 is a state transition diagram of a resource monitor.

Resource monitor 13 assumes one of four operating states, i.e., unblocked, blocking, unblocking and stable states, depending on the result of comparison between the resource availability value N and thresholds L1, L2, L3, L4 and L5 which are arranged in descending order. As illustrated in a state transition diagram (FIG. 2), resource monitor 13 is in an all-connections-unblocked state, or simply an "unblocked" state, when flow-control constraint is removed from all established connections and in this unblocked state it assumes one of two states, "new connection allowed" and "new connection refused", and shifts from "new connection allowed" state to "new connection refused" state as indicated by route (1) in FIG. 2 if the resource value N is smaller than the highest threshold L1 which represents a new connection threshold and shifts in reverse direction as indicated by route (2) when N is equal to or greater than L1. There is a shift from the "unblocked" state to a blocking state through route (3) if N becomes smaller than the lowest threshold L5 which represents a start-of-blocking threshold to effect a blocking phase.

Resource monitor 13 shifts from the blocking state to a stable state through route (4) if N becomes greater than L4 which represents an end-of-blocking threshold and shifts back to the blocking state as indicated by route (5) if N becomes less than L5. If N becomes greater than the second highest threshold L2 representing a start-of-unblocking threshold, route (6) is taken to shift from the stable state to an unblocking state and shifts in reverse direction as indicated by route (7) if N becomes lower than the third highest threshold L3 which represents an end-of-unblocking threshold but remains at least as high as L5. There is a shift from the unblocking state to the blocking state as given by route (8) if N becomes smaller than L1. If resource monitor 13 receives an all-connections-unblocked (ACUB) notification from congestion relief manager 14 on path 26 while in the unblocking state, it exits the unblocking state and returns to the "unblocked" state as indicated by route (9).

As shown in FIG. 3, the operation of the connection setup processor 8 starts if a new connection request is received from a user or from a remote routing controller (step 30). Connection setup processor 8 checks to see if the connection request is allowed or refused by resource monitor 13 (step 31) by examining the allow/refuse status data on path 24. If the request is refused, a connection refusal notification is sent to the user or routing controller (step 32), and if allowed, normal new connection request procedure is followed (step 33).

In FIG. 4, data sender 10 begins its operation if it receives a "data send" request from the user (step 35). At step 36 a check is performed to see if the buffering of data is required. If a queue has been formed by previous data messages, the answer is affirmative at step 36 and at step 37 a "hunt resource" request is sent on path 18 to the resource availability counter 13A to decrement its value. At step 38, data sender 10 inquires the resource monitor 13 about its operating state on path 25. If resource monitor 13 is determined to be in a blocking state, control branches to step 39 to mark the associated active connection as "outgoing-blocked" in the connection memory 11 and send an "outgoing flow control" notification to the user (step 40), while holding data in the buffer of data sender 10 (step 41). If resource monitor 13 is not in the blocking state, control branches at step 38 to step 41, skipping steps 39 and 40. If the buffering of data is not required, control branches at step 36 to step 46 to immediately process outgoing data messages from the user. At step 47, a check is performed to determine if resources are to be released. If resources are to be released, control branches at step 47 to step 48 apply a "release resource" request on path 18 to increment the available resource value N. The routine then terminates. If an unblock status indication is given on path 21 by congestion relief manager 14 (step 42), data sender 10 marks the associated active connection as outgoing unblocked (step 43) and informs the user of the end of flow control (step 44). If data is stored in the buffer (step 45), control proceeds to step 46. Otherwise, the routine terminates by setting the resource monitor state to unblocked.

In FIG. 5, data receiver 9 begins its operation when it receives an incoming data indication from STP 4 (step 50). If buffering of data is required (step 51), control branches to step 52 to apply a "hunt resource" request on path 17 to decrement the available resource value N. At step 53, control inquires the resource monitor 13 about its operating state through path 25. If resource monitor 13 is determined to be in a blocking state, control branches to step 54 to mark the established connection as "incoming-blocked" in the connection memory 11, apply flow control on incoming data messages (step 55) and hold the incoming data messages in the buffer of data receiver 9. If resource monitor 13 is not in the blocking state (step 53), control exits to step 56, skipping steps 54 and 55. If the buffering of data is not required (step 51), it sends the incoming data messages immediately to the user (step 57) and checks to see if resources are to be released (step 58). If resources are to be released, control branches at step 58 to step 59 apply a "release resource" request on path 17 to increment the available resource value N. If resources are not released as a result of actions taken at step 57, the routine terminates at step 58. If an unblock status indication is given on path 22 by congestion relief manager 14 (step 60), data receiver 9 marks the associated active connection as "incoming unblocked" (step 61) and removes the flow control (step 62), and then terminates.

The operation of resource monitor 13 will be described in detail with reference to the flowchart of FIG. 6. When resource monitor 13 receives an all-connections-unblocked (ACUB) notification from congestion relief manager 14 over line 26 (step 70), it proceeds to step 71 to determine whether it is in the unblocking state. If the answer is negative, the current state remains unchanged. If resource monitor 13 is in the unblocking state, control branches at step 71 to step 72 to determine whether the resource availability value N is lower than the new connection threshold L1. If the answer is affirmative, at step 73 the new connection allow/refuse status is marked "refuse" and the procedure terminates by setting the state of resource monitor 13 to "unblocked". If the decision at step 72 yields a negative answer, at step 74 the new connection allow/refuse status is marked "allow" and the procedure terminates by setting the state of resource monitor 13 to "unblocked".

If resource monitor 13 receives a "hunt resource" notification on path 17 or 18 (step 75), it decrements the resource availability counter 13A (step 76). If the resource monitor receives a "release resource" request (step 77), it increments the counter 13A (step 78). In either event, after updating the counter, control advances to step 79 to determine whether the value N is less than the start-of-blocking threshold L5. If it is, at step 80, an end unblocking (EUB) request is given to congestion relief manager 14, and at step 91, the new connection allow/refuse state, read by the connection setup processor 8 using path 24, is marked to refuse new connections. The routine then terminates by marking the resource monitor state to "blocking". If the answer is negative at step 79, control proceeds to step 82 where the current state of the resource monitor is checked.

If the resource monitor is in the blocking state at step 82, the resource availability value N is compared with the end-of blocking threshold L4 at step 83. If N>L4, the resource monitor terminates by changing to the stable state. If N≦L4, the resource monitor remains in the blocking state. If the resource monitor is in the stable state at step 82, the resource availability value N is compared with the start-of-unblocking threshold L2 at step 84. If N>L2, at step 85, a start unblocking (SUB) request is given to congestion relief manager 14, and the resource monitor changes to the unblocking state. If N≦L2, the current stable state remains unchanged. If the current resource monitor state is unblocking at step 82, it is determined at step 86 whether N is both smaller than the end-of-unblocking threshold L3 and equal to or greater than the start-of-blocking threshold L5. If the answer at step 86 is affirmative, step 87 gives an end unblocking (EUB) request to congestion relief manager 14. Otherwise, the resource monitor remains in the unblocking state. If the resource monitor is in the unblocked state at step 82, control shifts to step 72 to where the resource availability value N is compared with the new connection threshold L1.

The operation of the congestion relief manager 14 proceeds as illustrated in FIG. 7. When congestion relief manager 14 receives an SUB (start unblocking) request from resource monitor 13 (step 90), it reads connection data from memory 11 via path 20 and checks to see if all active connections are unblocked (step 91). If the answer is negative, control moves to step 92 where connection data is read from memory 11 over path 20 to determine whether the connection is marked "outgoing unblocked" in connection memory 11. If the connection is outgoing blocked, an "unblock" notification is applied on path 21 to data sender 10 at step 93. Otherwise, step 93 is skipped. A similar process is repeated for the data receiver 9 at step 94 at which point it is determined whether the connection is marked "incoming blocked" in memory 11, and if so, the congestion relief manager 14 provides an "unblock" notification on path 22 to data receiver 9 at step 95. If the answer is negative at step 94, step 95 is skipped. At step 96, control determines whether a predetermined limit value is reached, and if not, step 91 is repeated to determine whether additional connections remain to be unblocked. If the number of connections unblocked since the last suspension or since process activation has reached a predetermined limit at step 96, then a timer is initiated at step 97. In this manner, a restriction is imposed on the number of connections which can be marked unblocked over a given time period. The timer initiated at step 97 continues until a timeout occurs at step 98 or else until a EUB request is received at step 99 from the resource monitor 13. The timer is unaffected by receipt of the SUB request at step 101. If the EUB request is received at step 99 while timing is underway, the timer is stopped at step 100 and the congestion relief manager procedure terminated. If the EUB request is not given within the timeout period, control branches at decision step 98 to step 91 to repeat the flow control release on another set of of connections. Thus, the number of blocked connections decreases with time until either the EUB request is received at step 99 or else until no established connections remain blocked. If the decision at step 91 yields a negative indication, control branches to step 102 at which point the all-connections-blocked (ACUB) notification is sent to resource monitor 13 and the unblocking procedure is terminated.

Figure 8:
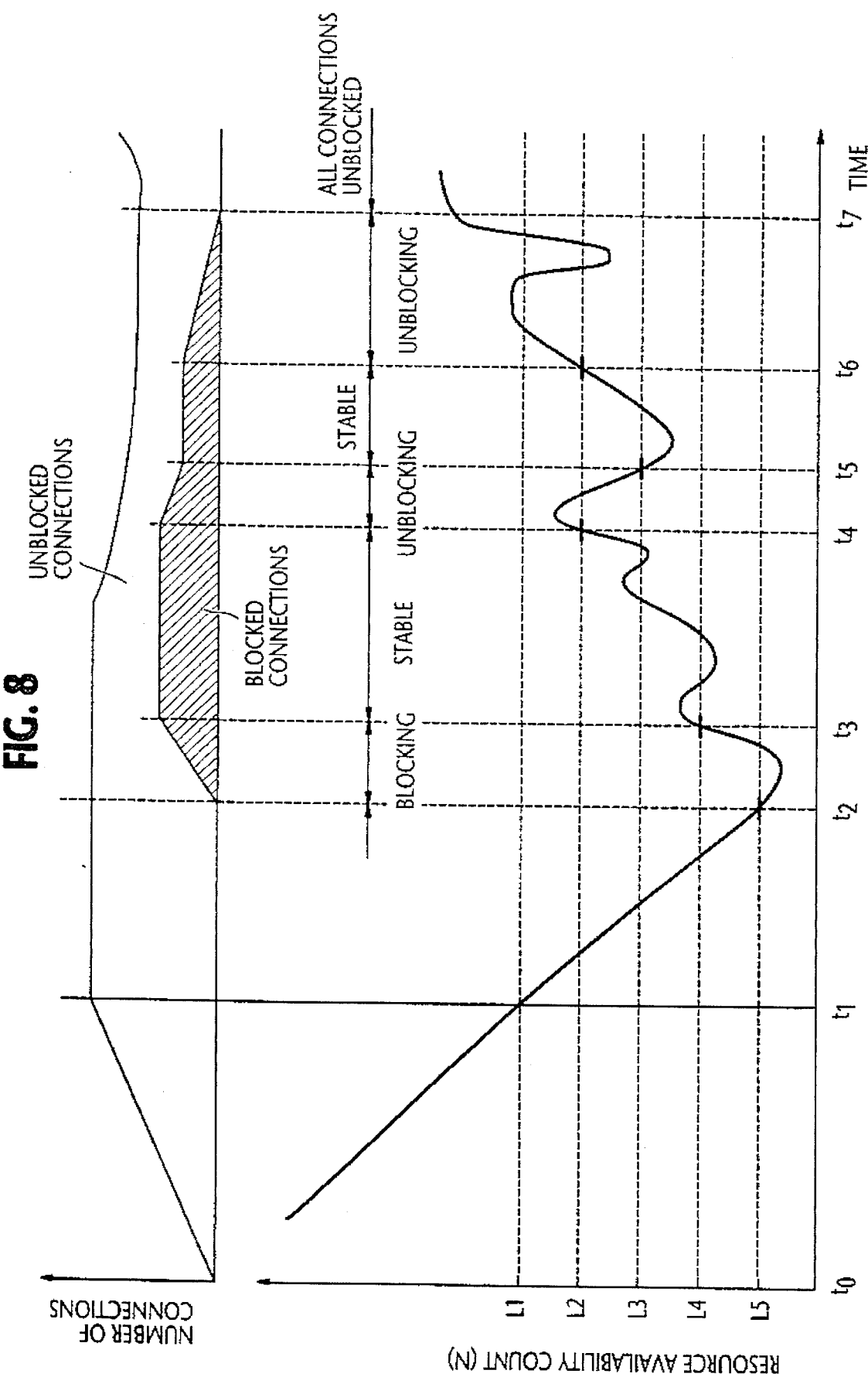
FIG. 8 is a graphic representation of resource availability count plotted as a function of time under a varying number of established connections.

The overall operation of the controller 1 will be described with reference to FIG. 8 in which the top graph shows the number of active connections plotted against time. The shaded portion of the graph indicates the number of active connections that are blocked. The lower graph represents the resource availability value N versus time. At time $t_0$, no active connections exist and all resources are available. As time progresses, the number of active connections steadily increases while the resource availability value N decreases to a level below threshold L1 at time $t_1$ (steps 72 and 73). From time $t_1$ onwards, new connection requests are refused, placing an upper limit on the number of active connections that are allowed so that it remains flat. Nevertheless, existing active connections continue using resources until the availability value N reduces below the start-of-blocking threshold L5 at time $t_2$ (steps 79, 80 and 81). Therefore, resource manager 13 shifts to a blocking state at time $t_2$, which continues until time $t_3$. During this blocking state, active connections are progressively blocked by data receiver c) and data sender 10 (steps 54, 55, 39, 40) until the resource availability value N becomes greater than the end-of-blocking threshold L4 at time $t_3$ (step 83), whereupon resource monitor 13 shifts from the blocking state to a stable state which is assumed to last until time $t_4$. During this stable state, active connections are neither blocked nor unblocked, and resource availability and demand come to an equilibrium. The number of active connections, however, decreases as user tasks ran to completion and disconnect their associated connections.

At time $t_4$, resource availability value N exceeds the start-of-unblocking threshold L2 (step 81) and resource monitor 13 enters an unblocking state and congestion relief manager 14 applies "unblock" notifications to data receiver 9 on path 21 and data sender 10 on path 22 to initiate connection unblocking (steps 93, 95, 42, 43, 44, 60, 61, 62,). As connections are unblocked, the demand for SCCP resources increases and resource availability value N decreases until it becomes lower than the end-of-unblocking threshold L3 at time $t_5$ (steps 86 and 99), at which time the congestion relief manager 14 terminates the unblocking process and the resource relief manager remains in the stable state until the availability value N again exceeds the start-of-unblocking threshold L2 at time $t_6$ (step 84), at which time the resource monitor 13 returns to the unblocking state and the congestion relief manager 14 re-starts the unblocking process (step 90). Unblocking continues until all active connections have become unblocked at time $t_7$, at which time the value N exceeds the new connection threshold L1 (step 72). At time $t_7$, the resource monitor 13 changes to the unblocked state and new connection requests are again accepted (step 74). From time $t_7$, the number of active connections increases as new connection requests are accepted.

The advantageous effect of the controller 1 is the ability to handle an increase In traffic on SCCP connections without data loss and without having to clear down existing connections using a feedback control mechanism so that demand and resource availability are balanced against each other. More specifically, controller 1 provides the advantages of allowing greater traffic to be handled over a larger number of connections, allowing momentary surges for resources to be accommodated by applying flow control to established connections and by refusing to accept new connection requests. Additionally, controller 1 allows resources to be allocated over the entire set of established connections rather than having to reserve resources on a connection basis at the time of connection establishment.

What is claimed is:

1. A connection-oriented congestion controller adapted for use in one of a plurality of interconnected signaling nodes of a common channel signaling network for controlling traffic on connections established through said network, comprising:

connection setup means for establishing a connection in response to a connection request when there is a grant indication that a connection request is allowed;

a memory for storing data representative of the established connections marked as blocked or unblocked;

data receiving and sending means, connected between user terminals and one of the signaling nodes, for receiving and sending data messages on the established connections, said data receiving and sending means being responsive to a blocking status indication for imposing flow control on said data messages and for marking the established connections as blocked in said memory, and which is further responsive to an unblocking status indication for removing said flow control and for marking the established connections as unblocked in said memory; and control means connected to said data receiving and sending means in a feedback loop for generating a resource availability value representative of availability of the established connections, for comparing the resource availability value with a start-of-blocking threshold, an end-of-blocking threshold, a start-of-unblocking threshold and an end-of-unblocking threshold, and for producing said blocking status indication when the resource availability value becomes lower than the start-of-blocking threshold until the resource availability value becomes higher than the end-of-blocking threshold, or for producing said unblocking status indication when the resource availability value becomes higher than the start-of-unblocking threshold until the resource availability value becomes lower than the end-of-unblocking threshold, for comparing said resource availability value with a new connection threshold when all of the established connections are marked unblocked in said memory, and for producing said grant indication when the resource availability value is determined to be greater than said new connection threshold.

2. A connection-oriented congestion controller as claimed in claim 1, wherein the start-of-blocking threshold is smaller than the end-of-blocking threshold, the start-of-unblocking threshold is higher than the end-of-unblocking threshold, and the end-of-unblocking threshold is higher than the end-of-blocking threshold, and wherein said new connection threshold is higher than the start-of-unblocking threshold.

3. In a connection-oriented congestion controller adapted for use in one of a plurality of interconnected signaling nodes of a common channel signaling network, comprising connection setup means for establishing a connection in response to a connection request when there is a grant indication that a connection request is allowed, a memory for storing data representative of incoming blocking status, marked as one of blocked and unblocked, and outgoing blocking status, marked as one of blocked and unblocked, of each of said nodes, and data receiving and sending means connected between user terminals and one of the signaling nodes for receiving and sending data over established connections, a method comprising the steps of:

a) generating a resource availability value representative of resources available to established connections for sending and receiving user data;

b) comparing the resource availability value with a start-of-blocking threshold, an end-of-blocking threshold, a start-of-unblocking threshold and an end-of-unblocking threshold, and producing a blocking status indication when the resource availability value becomes lower than the start-of-blocking threshold until the resource availability value becomes higher than the end-of-blocking threshold, or an unblocking status indication when the resource availability value becomes higher than the start-of-unblocking threshold until the resource availability value becomes lower than the end-of-unblocking threshold;

c) imposing flow control on said data messages and marking the established connections as blocked in said memory in response to said blocking status indication;

d) removing said flow control and marking the established connections as unblocked in said memory in response to said unblocking status indication;

e) comparing said resource availability value with a new connection threshold when all of the established connections are marked unblocked in said memory;

f) producing said grant indication when the resource availability value is determined to be greater than said new connection threshold; and g) repeating steps a) to f).

4. A method as claimed in claim 3, wherein the start-of-blocking threshold is smaller than the end-of-blocking threshold, the start-of-unblocking threshold is higher than the end-of-unblocking threshold, and the end-of-unblocking threshold is higher than the end-of-blocking threshold, and wherein said new connection threshold is higher than the start-of-unblocking threshold.

5. A connection-oriented congestion controller adapted for use in one of a plurality of interconnected signaling nodes of a common channel signaling network supporting signaling connections, comprising:

connection setup means for establishing a signaling connection in response to a connection request when there is a grant indication that a connection request is allowed;

a memory for storing data representative of each established signaling connection which is marked as one of outgoing blocked, outgoing unblocked, incoming blocked and incoming unblocked;

data sending means, connected between user terminals and one of the signaling nodes and further connected to said memory, for receiving data messages on established signaling connections;

data sending means, connected between user terminals and one of the signaling nodes and further connected to said memory, for sending data messages on established signaling connections;

congestion relief means, connected to said memory, said sending means and said receiving means and responsive to a start-of-unblocking signal and an end-of-unblocking signal, for unblocking, at a predetermined rate, said established signaling connections which have been marked as one of outgoing blocked and incoming blocked in said memory;

said data sending means being responsive to a blocking status signal for marking an established signaling connection as outgoing blocked in said memory when message data to be sent must be buffered by said data sending means;

said data sending means being responsive to an unblock request signal supplied from said congestion relief means for marking an established signaling connection as outgoing unblocked in said memory;

said data receiving means being responsive to a blocking status signal for marking an established signaling connection as incoming blocked in said memory when received message data must be buffered by said data receiving means;

said data receiving means being responsive to an unblock request signal supplied from said congestion relief means for marking an established signaling connection as incoming unblocked in said memory; and control means, connected to said data receiving means, said data sending means and to said congestion relief means, for generating a resource availability value representative of availability of said established signaling connections for sending a data message and for receiving a data message, for comparing said resource availability value with a start-of-blocking threshold, and end-of-blocking threshold, a start-of-unblocking threshold and an end-of-unblocking threshold, and for producing said blocking status signal when the resource availability value becomes lower than the start-of-blocking threshold until the resource availability value becomes higher than the end-of-blocking threshold, or said unblocking status indication when the resource availability value becomes higher than the start-of-unblocking threshold until the resource availability value becomes lower than the end-of-unblocking threshold, comparing said resource availability value with a new connection threshold if all of said established signaling connections are marked unblocked in said memory, and producing said grant indication if the resource availability value is determined to be lower than said new connection threshold.

* * * * *